(12) United States Patent
Henning et al.

(10) Patent No.: US 9,253,276 B2
(45) Date of Patent: Feb. 2, 2016

(54) MULTI-PROTOCOL BRIDGE WITH INTEGRATED PERFORMANCE ACCELERATING CACHE

(75) Inventors: Brett Henning, Colorado Springs, CO (US); Scott Dominguez, Colorado Springs, CO (US); Jason McGinley, Castle Rock, CO (US); Edoardo Daelli, Castle Rock, CO (US); Matthew Freel, Colorado Springs, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 922 days.

(21) Appl. No.: 13/436,073

(22) Filed: Mar. 30, 2012

(65) Prior Publication Data
US 2013/0259062 A1 Oct. 3, 2013

(51) Int. Cl.
*H04L 12/28* (2006.01)
*H04L 29/08* (2006.01)

(52) U.S. Cl.
CPC .................. *H04L 67/2842* (2013.01)

(58) Field of Classification Search
CPC ........................................ H04L 12/56
See application file for complete search history.

(56) References Cited

U.S. PATENT DOCUMENTS

| | | | |
|---|---|---|---|
| 5,978,951 A | 11/1999 | Lawler et al. | |
| 7,512,663 B1 * | 3/2009 | Kodama et al. | 709/212 |
| 7,536,508 B2 | 5/2009 | Davies | |
| 8,402,198 B1 * | 3/2013 | de la Iglesia et al. | 711/3 |
| 2004/0215883 A1 | 10/2004 | Bamford et al. | |
| 2006/0156060 A1 | 7/2006 | Forrer, Jr. et al. | |
| 2008/0148303 A1 * | 6/2008 | Okamoto et al. | 720/652 |
| 2011/0142062 A1 * | 6/2011 | Wang et al. | 370/401 |

* cited by examiner

*Primary Examiner* — Robert Wilson
*Assistant Examiner* — Nourali Mansoury

(57) ABSTRACT

A protocol bridge includes a cache for caching data from a plurality of data storage devices, and for servicing data requests from a plurality of initiators. Data is cached for every data access operation such that the most frequently accessed data remains replicated in the cache.

15 Claims, 5 Drawing Sheets

MULTI-PROTOCOL BRIDGE WITH INTEGRATED PERFORMANCE ACCELERATING CACHE

FIELD OF THE INVENTION

The present invention is directed generally toward network devices, and more particularly toward protocol bridges.

BACKGROUND OF THE INVENTION

A protocol bridge typically consists of two parts; a front-end that connects to initiator devices (typically storage controllers) and a back-end that connects to target devices (typically data storage devices). The back-end uses a protocol designed for target devices while the front-end uses a protocol designed for initiator devices. The front-end and back-end do not need to use the same protocol; rather, each system component may use whatever protocol is best suited to the attached devices. For instance, the front-send could use Fibre Channel over Ethernet (FCoE) while the back end could use Serial Attached SCSI (SAS).

The protocol bridge converts data traffic from one protocol to another so that devices using different protocols may effectively communicate. A protocol bridge may allow various initiator devices to retrieve data from more than one SAS data storage device.

Data storage devices routinely utilize caches to accelerate performance by replicating the most frequently accessed subset of all the data in the data storage device in a memory utilizing data storage technology having improved performance characteristics (such as access time) as compared to the data storage technology utilized to store all of the data in the data storage device.

In a data storage system utilizing a protocol bridge, each data storage device may include a cache to replicate the most frequently accessed data on each the data storage device. Where each data storage device includes a cache, each data storage device must independently determine what subset of data is accessed most frequently. Such methodology may lead to inefficiencies; for example, where data is replicated in two or more data storage devices, and load balancing spreads data access operations across the two or more data storage devices, each data storage device may not recognize that the data is frequently accessed. The total access time for data in such a system may therefore be sub-optimal.

Alternatively, each initiator device may employ a cache to replicate data most frequently accessed by the initiator device from one or more data storage devices connected to the protocol bridge. Where each initiator includes a cache, each initiator must independently determine what data it accesses most frequently. Such methodology may also lead to inefficiencies; for example, each initiator may cache the same data, thus reducing the total amount of cache space available for other data. The total access time for data in such a system may therefore be sub-optimal.

Consequently, it would be advantageous if an apparatus existed that is suitable for caching data from a plurality of data storage devices in a protocol bridge, and making such cached data available to a plurality of initiators.

SUMMARY OF THE INVENTION

Accordingly, the present invention is directed to a novel method and apparatus for caching data from a plurality of data storage devices in a protocol bridge, and making such cached data available to a plurality of initiators.

One embodiment of the present invention is a protocol bridge with cache memory and a processor configured to determine what data from a plurality of data storage devices should be cached.

Another embodiment of the present invention is a protocol bridge with cache memory, wherein the cache memory is divided among two or more data storage devices. Each data storage device may have an independent cache within the cache memory of the protocol bridge.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
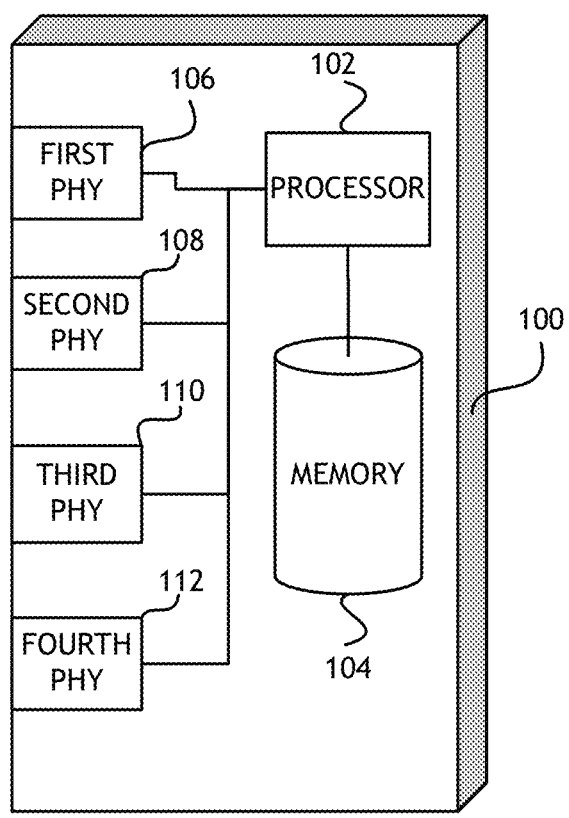
FIG. 1 shows a block diagram of a protocol bridge.

Referring to FIG. 1, a diagram of a protocol bridge 100 according to the present invention is shown. The protocol bridge 100 may include a processor 102, memory 104 connected to the processor 102, and a plurality of physical connection points (PHYs) 106,108,110,112. Each of the plurality of PHYs 106,108,110,112 may be configured to establish a connection with a device, such as a SAS data storage device or an initiator device, utilizing a certain communications protocol. At least two of the plurality of PHYs 106,108,110, 112 may be configured to establish connections to devices that utilize incompatible communications protocols. Where devices utilizing incompatible communications protocols attempt to communicate with each other, the processor 100 may be configured to translate data from one communications protocol to another and relay such data between the devices.

In a protocol bridge 100 with a memory 104, the memory 104 may be configured as a cache for two or more data storage devices connected to the protocol bridge 100 through two or more of the plurality of PHYs 106,108,110,112. Where the memory 104 is configured as a cache, the processor 102 may be configured to monitor data access requests from one or more initiator devices connected to the protocol bridge 100 through one or more of the plurality of PHYs 106,108,110, 112 to determine what data in the two or more data storage devices is most frequently accessed. The processor 102 may replicate the most frequently accessed data from the two or more data storage devices in the memory 104 to accelerate future data access requests.

Figure 2:
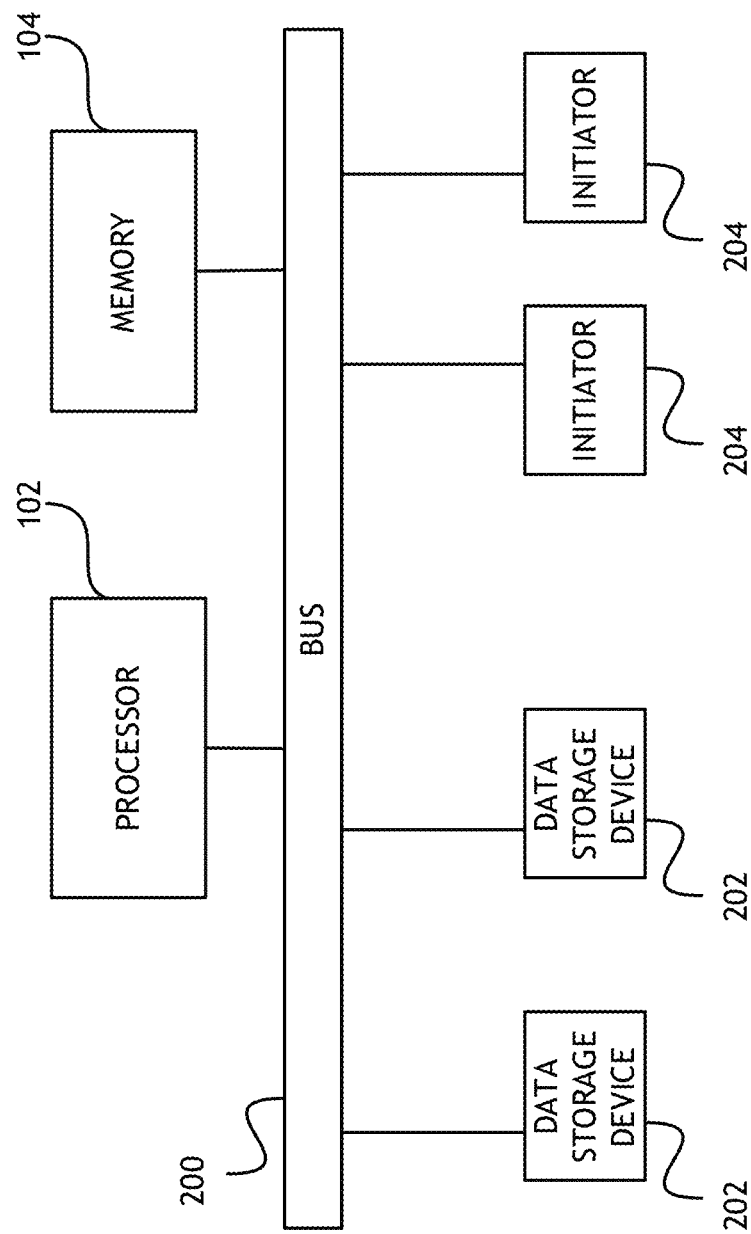
FIG. 2 shows a diagram of a BUS configuration of a protocol bridge such as shown in FIG. 1.

Referring to FIG. 2, a block diagram of a system utilizing one embodiment of a protocol bridge according to the present invention is shown. One embodiment of a protocol bridge according to the present invention may include a processor 102 and a memory 104, each of the processor 102 and the memory 104 connected to a BUS 200. Two or more data storage devices 202 may be connected to the BUS 200 through two or more PHYs, each of the two or more PHYs configured to allow communication with a device by a particular communications protocol. The data storage devices 202 may include SAS hard disk drives. One or more initiator devices 204 may be connected to the BUS 200 through one or more PHYs, each of the one or more PHYs configured to allow communication with a device by a particular communication protocol. The initiator devices 204 may include devices such as a computer configured to communicate via FCoE.

The processor 102 and memory 104 may be incorporated into the input/output (IO) path for every data transaction between a data storage device 202 and an initiator device 204. The processor 102 may record and analyze IO operations to determine what data in the two or more data storage devices is most frequently accessed and replicate the most frequently accessed data in the memory 104 such that the memory 104 may serve as a cache. Frequency of data access may be measured system wide such that the most frequently accessed data from all of the two or more data storage devices 202 is replicated in the memory 104, or frequency of data access may be measured per data storage device such that the most frequently accessed data from each of the two or more data storage devices 202 is replicated in the memory 104. Where data is mirrored on two or more data storage devices 202 for the purpose of load balancing, the processor 102 may correlate such mirrored data when determining the frequency of data access.

By incorporating the processor 102 and memory 104 into the IO path of every data transaction, overall performance of the protocol bridge may be improved because the processor 102 may cache frequently accessed data while performing protocol translation operations concerning the frequently accessed data.

Figure 3:
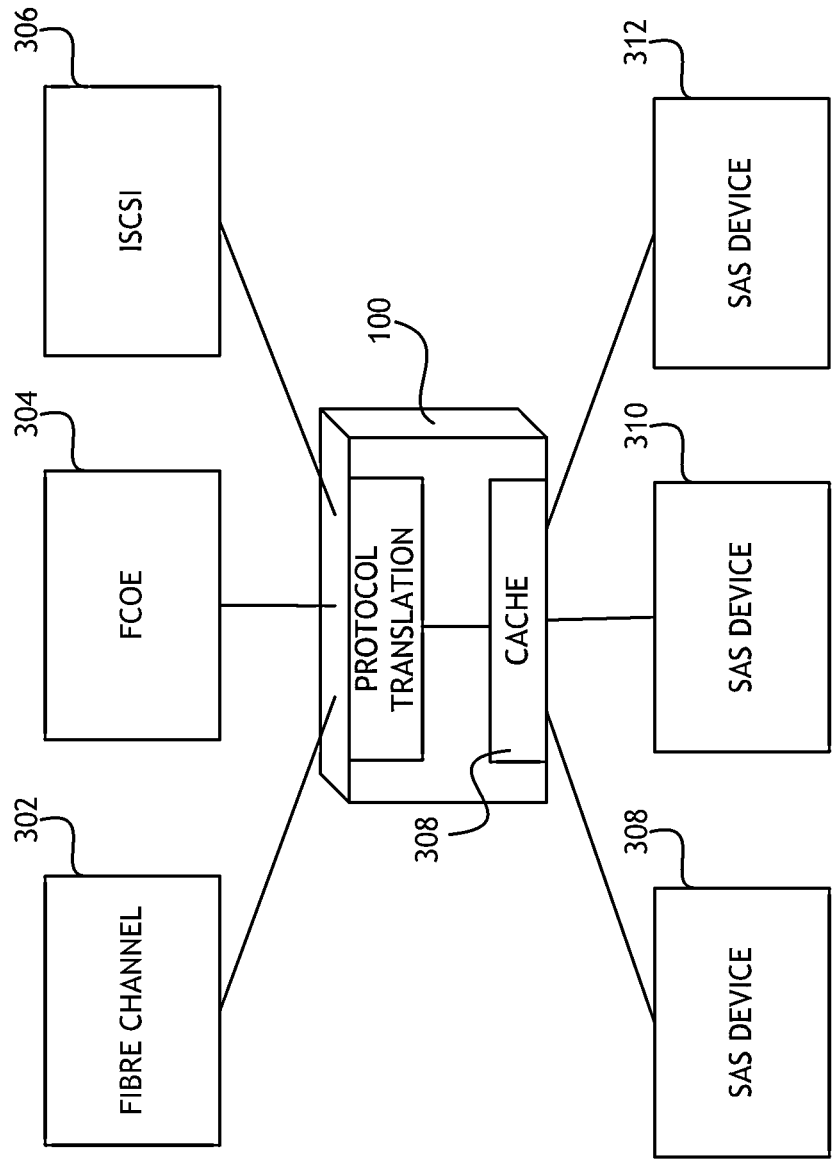
FIG. 3 shows a block diagram of a system including a protocol bridge according to the present invention.

Referring to FIG. 3, a block diagram of a system having a protocol bridge 100 according to at least one embodiment of the present invention is shown. The system may include a plurality of data storage devices 308,310,312. Each of the plurality of data storage devices 308,310,312 may utilize a particular data communications protocol or two or more of the plurality of data storage devices 308,310,312 may utilize a common data communications protocol. For example, the data storage devices 308,310,312 may be SAS devices or SATA devices. One skilled in the art may appreciate that these protocols are exemplary only and that other protocols may be contemplated.

The system may include one or more initiator devices 302,304,306. Each of the one or more initiator devices 302, 304,306 may utilize a particular data communication protocol or two or more initiator devices 302,304,306 may utilize a common data communications protocol. For example, a first initiator device 302 may utilize fibre channel (FC) protocol and a second initiator device 304 may utilize FC protocol in an FCoE infrastructure. A third initiator device 306 may utilize internet small computer system interface (iSCSI) protocol. One skilled in the art may appreciate that these protocols are exemplary only and that other protocols may be contemplated.

The system may include a protocol bridge 100 with a cache 308. The cache 308 may cache data from the plurality of data storage devices 308,310,312 as initiator devices 302,304,306 submit IO requests for data from the data storage devices 308,310,312. Such IO requests may go through protocol translation by a processor in the protocol bridge 100 so that the IO requests may be sent to the data storage devices 308, 310,312 using a protocol compatible with such data storage device 308,310,312. Likewise, IO operations from the data storage devices 308,310,312 may go through protocol translation by a processor in the protocol bridge 100 so that the data may be sent to the initiator device 302,304,306 using a protocol compatible with such initiator device 302,304,306. According to at least one aspect of the present invention, every IO operation to retrieve data from a data storage device 308,310,312 may cause such data to be written to the cache 308.

Figure 4:
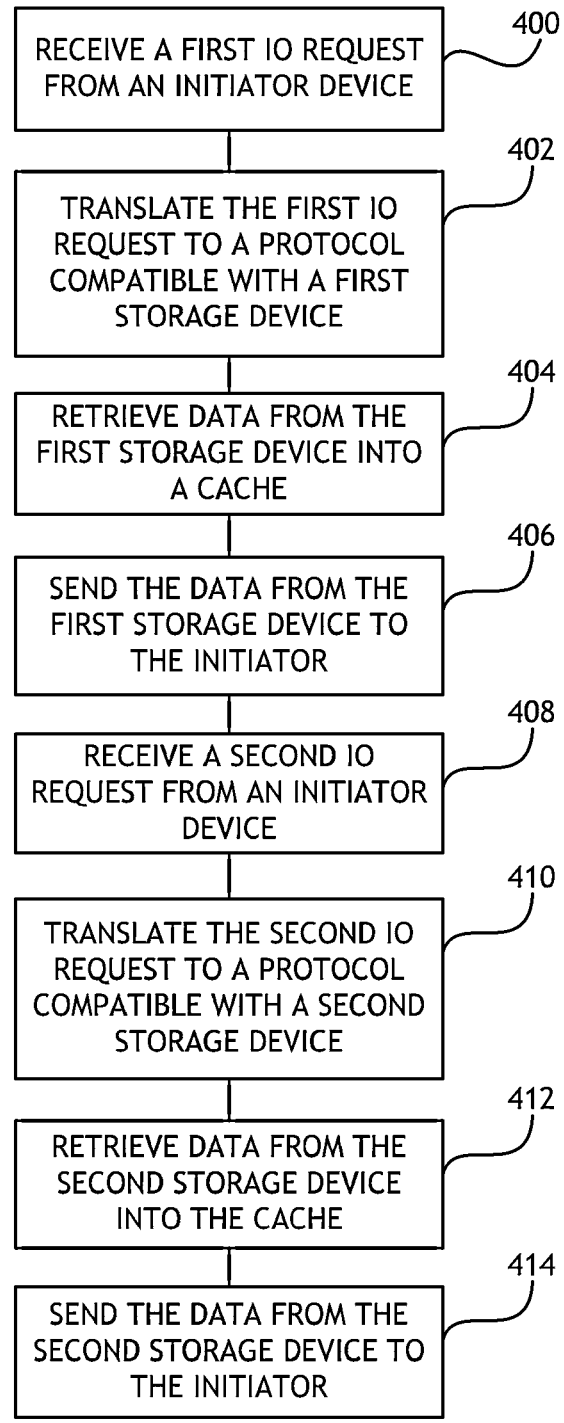
FIG. 4 shows a flowchart of a method for caching data in a protocol bridge.

Referring to FIG. 4, a flowchart for a method of caching data in a protocol bridge according to the present invention is shown. A protocol bridge having memory incorporated into the IO path of all data transactions may receive 400 a first IO request from an initiator device. Where the initiator device uses a communications protocol that is incompatible with a first data storage device associated with the first IO request, a processor may translate 402 the first IO request to a protocol compatible with the first data storage device. The processor may then retrieve 404 the data called for by the first IO request from the first data storage device into a cache in the protocol bridge. The processor may then send 406 the data called for by the first IO request to the initiator, translating the data to a communications protocol compatible with the initiator as necessary. The protocol bridge may then receive 408 a second IO request from an initiator device. Where the initiator device uses a communications protocol that is incompatible with a second data storage device associated with the second IO request, a processor may translate 410 the second IO request to a protocol compatible with the second data storage device. The processor may then retrieve 412 the data called for by the second IO request from the second data storage device into the cache in the protocol bridge. The processor may then send 414 the data called for by the second IO request to the initiator, translating the data to a communications protocol compatible with the initiator as necessary. A subsequent IO request for either the data associated with the first IO request or the second IO request may be satisfied with data from the cache, obviating the need to send an IO request to either the first data storage device or the second data storage device, or to translate the subsequent IO request to a communications protocol compatible with either the first data storage device or the second data storage device. IO requests may therefore be processed more efficiently.

Figure 5:
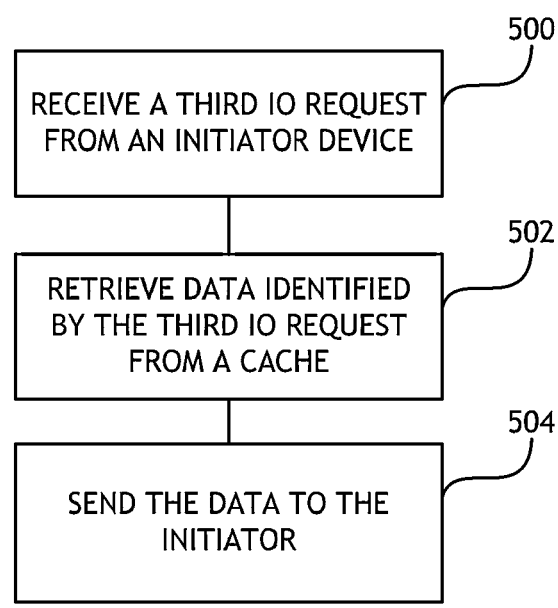
FIG. 5 shows a flowchart of a method for retrieving data from a cache in a protocol bridge.

Referring to FIG. 5, a flowchart for a method of retrieving data in a protocol bridge having a cache according to the present invention is shown. A protocol bridge having memory incorporated into the IO path of all data transactions may receive 500 a third IO request from an initiator device. Where the third IO request identifies data previously retrieved from a data storage device and replicated in a cache in the protocol bridge, the processor may retrieve 502 the data called for by the third IO request from the cache without sending the third IO request to a data storage device. The processor may then send 504 the data called for by the first IO request to the initiator.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A protocol bridge comprising:
a processor;
memory connected to the processor;
a plurality of PHYs, at least two of the plurality of PHYs configured to connect to at least two separate data storage devices, and at least one of the plurality of PHYs configured to connect to at least one initiator device; and
computer executable program code configured to execute on the processor,
wherein:
the memory is configured as two or more data caches for the at least two separate data storage devices; and
the computer executable program code configures the processor to: cache data from two or more data storage devices in the memory;
receive a first IO request from a first initiator in data communication with the processor through one of the plurality of PHYs;
retrieve data identified by the first IO request from a first data storage device connected to one or more of the plurality of PHYs;
write the data identified by the first IO request to the memory;
send the data identified by the first IO request to the first initiator;
receive a second IO request from a second initiator in data communication with the processor, wherein the second IO request identifies the same data identified by the first IO request;
retrieve the data identified by the second IO request from the memory; and
send the data identified by the second IO request to the second initiator;
wherein the computer executable program code further configures the processor to:
receive a third IO request from an initiator, wherein the third IO request identifies the same data identified by one of the first IO request and the second IO request;
retrieve the data identified by the third IO request from the memory; and send the data identified by the third IO request to the initiator.

2. The protocol bridge of claim 1, wherein the computer executable program code further configures the processor to translate the first IO request to a communications protocol compatible with the first data storage device.

3. The protocol bridge of claim 1, wherein at least one of the plurality of PHYs is configured to connect to a SAS data storage device.

4. The protocol bridge of claim 1, wherein at least one of the plurality of PHYs is configured to connect to a iSCSI initiator.

5. The protocol bridge of claim 1, wherein at least one of the plurality of PHYs is configured to connect to a FCoE initiator.

6. The protocol bridge of claim 1, wherein the memory comprises solid state memory.

7. A protocol bridge comprising:
a processor;
memory connected to the processor;
a plurality of PHYs, at least two of the plurality of PHYs configured to connect to at least two separate data storage devices, and at least one of the plurality of PHYs configured to connect to at least one initiator device; and
computer executable program code configured to execute on the processor,
wherein:
the memory is configured as two or more data caches, each of the two or more data caches uniquely associated with one of two or more data storage devices;
the computer executable program code configures the processor to:
receive a first IO request from a first initiator in data communication with the processor through one of the plurality of PHYs;
retrieve data identified by the first IO request from a first data storage device connected to one or more of the plurality of PHYs;
write the data identified by the first IO request to a first data cache in the memory;
send the data identified by the first IO request to the first initiator;
receive a second IO request from a second initiator in data communication with the processor through one of the plurality of PHYs;
retrieve data identified by the second IO request from a second data storage device connected to one or more of the plurality of PHYs;
write the data identified by the second IO requests to a second data cache in the memory;
send the data identified by the second IO requests to the second initiator;
receive a third IO request from a third initiator, wherein the third IO request identifies the same data identified by one of the first IO request and the second IO request;
retrieving the data identified by the third IO request from one of the first data cache and the second data cache; and
sending the data identified by the third IO request to the third initiator.

8. The protocol bridge of claim 7, wherein the computer executable program code further configures the processor to translate the first IO request to a communications protocol compatible with the first data storage device.

9. The protocol bridge of claim 7, wherein at least one of the plurality of PHYs is configured to utilize a SAS compatible communications protocol.

10. The protocol bridge of claim 7, wherein at least one of the plurality of PHYs is configured to utilize an iSCSI compatible communications protocol.

11. The protocol bridge of claim 7, wherein at least one of the plurality of PHYs is configured to utilize a FC compatible communications protocol.

12. A method for caching data in a protocol bridge comprising:
receiving a first IO request from a first initiator of one or more initiators;
retrieving data identified by the first IO request from a first data storage device;
writing the data identified by the first IO request to a first cache in the protocol bridge, the first cache embodied in a portion of a memory;

sending the data identified by the first IO request to the first initiator;
receiving a second IO request from the a second initiator of the one or more initiators;
retrieving data identified by the second IO request from a second data storage device;
writing the data identified by the second IO requests to a second cache in the protocol bridge, the second cache embodied in a portion of the memory;
sending the data identified by the second IO requests to the second initiator;
receiving a third IO request from a third initiator of the one or more initiators, wherein the third IO request identifies the same data identified by one of the first IO request and the second IO request;
retrieving the data identified by the third IO request from the cache in the protocol bridge; and
sending the data identified by the third IO request to a third initiator.

13. The method of claim 12, wherein the first initiator and the second initiator are a single device.

14. The method of claim 12, further comprising translating the first IO request to a communications protocol compatible with the first data storage device.

15. The method of claim 12, further comprising translating the second IO request to a communications protocol compatible with the second data storage device.

\* \* \* \* \*